(12) United States Patent (10) Patent No.: US 12,654,518 B2
Johnson (45) Date of Patent: Jun. 16, 2026

(54) VEHICULAR REAR WINDOW ASSEMBLY WITH INTEGRATED CHMSL, CARGO LIGHT AND IN-CABIN LIGHT

(71) Applicant: Magna Exteriors, Inc., Troy, MI (US)

(72) Inventor: David K. Johnson, Holland, MI (US)

(73) Assignee: Magna Exteriors, Inc., Troy, MI (US)

( * ) Notice: Subject to any disclaimer, the term of this patent is extended or adjusted under 35 U.S.C. 154(b) by 0 days.

(21) Appl. No.: 18/910,082

(22) Filed: Oct. 9, 2024

(65) Prior Publication Data

US 2025/0135848 A1 May 1, 2025

Related U.S. Application Data

(60) Provisional application No. 63/593,660, filed on Oct. 27, 2023.

(51) Int. Cl.
| | |
|---|---|
| *B60J 1/18* | (2006.01) |
| *B60Q 1/44* | (2006.01) |
| *B60Q 3/208* | (2017.01) |
| *B60Q 3/30* | (2017.01) |
| *B60Q 3/50* | (2017.01) |
| *B60Q 3/62* | (2017.01) |
| *E05D 15/06* | (2006.01) |
| *F21S 41/24* | (2018.01) |
| *F21S 45/47* | (2018.01) |

(52) U.S. Cl.
CPC .............. *B60J 1/1853* (2013.01); *B60Q 1/44* (2013.01); *B60Q 3/208* (2017.02); *B60Q 3/30* (2017.02); *B60Q 3/50* (2017.02); *B60Q 3/62*

(2017.02); *E05D 15/0652* (2013.01); *F21S 41/24* (2018.01); *F21S 45/47* (2018.01); *E05Y 2900/55* (2013.01)

(58) Field of Classification Search
USPC ........................................... 49/413, 380, 125
See application file for complete search history.

(56) References Cited

U.S. PATENT DOCUMENTS

| | | |
|---|---|---|
| 4,488,141 A | 12/1984 | Ohlenforst et al. |
| 4,645,970 A | 2/1987 | Murphy |
| 4,758,931 A | 7/1988 | Gabaldon |
| 4,896,136 A * | 1/1990 | Hotovy .................... B60Q 3/74 |
| | | 340/479 |
| 4,920,698 A | 5/1990 | Friese et al. |
| 5,211,466 A | 5/1993 | Jarocki et al. |
| 5,400,225 A | 3/1995 | Currie |

(Continued)

*Primary Examiner* — Marcus Menezes
(74) *Attorney, Agent, or Firm* — HONIGMAN LLP

(57) ABSTRACT

A vehicular rear window assembly includes a lighting device having a housing portion that is configured for attachment at an upper region of an inner side of a window panel at a rear portion of a vehicle. The housing portion of the lighting device accommodates (i) a first light source arranged on a first circuit element, (ii) a second light source arranged on a second circuit element and (iii) a heat sink that is in thermally conductive connection with the circuit elements. The first light source emits light that passes through the window panel and that is viewable rearward of the vehicle. The second light source emits light that illuminates an interior portion of an interior cabin of the vehicle. The heat sink draws heat from the first circuit element and the second circuit element and dissipates heat to the housing portion of the lighting device.

28 Claims, 13 Drawing Sheets

(56) References Cited

U.S. PATENT DOCUMENTS

| | | | | |
|---|---|---|---|---|
| 5,580,153 | A | 12/1996 | Motz | |
| 5,831,523 | A | 11/1998 | Lange | |
| 5,839,231 | A | 11/1998 | Gebhart et al. | |
| 6,086,230 | A * | 7/2000 | Wooldridge | B60Q 3/30 |
| | | | | 362/543 |
| 6,536,930 | B1 | 3/2003 | Hirmer | |
| 7,036,965 | B2 | 5/2006 | Dalton, Jr. et al. | |
| 7,048,400 | B2 | 5/2006 | Murasko et al. | |
| 7,172,322 | B2 | 2/2007 | Pommeret et al. | |
| 7,347,608 | B2 | 3/2008 | Emde | |
| 7,431,486 | B2 * | 10/2008 | Bloemen | B60Q 1/0052 |
| | | | | 362/540 |
| 7,575,349 | B2 | 8/2009 | Bucher et al. | |
| 7,642,908 | B2 | 1/2010 | Mertens | |
| 8,047,691 | B2 | 11/2011 | Leese et al. | |
| 8,151,519 | B2 | 4/2012 | Bello et al. | |
| 8,382,350 | B2 | 2/2013 | Gold | |
| 8,402,695 | B2 | 3/2013 | Smith et al. | |
| 8,408,773 | B2 | 4/2013 | Judge | |
| 8,881,458 | B2 | 11/2014 | Snider et al. | |
| 8,882,318 | B2 | 11/2014 | Pfeil et al. | |
| 9,896,026 | B2 * | 2/2018 | Snider | B60Q 1/268 |
| 10,427,503 | B2 | 10/2019 | Snider | |
| 10,501,977 | B2 * | 12/2019 | Snider | B60J 1/1853 |
| 10,524,313 | B2 | 12/2019 | Snider et al. | |
| 10,559,153 | B2 | 2/2020 | Snider et al. | |
| 10,668,868 | B2 | 6/2020 | Snider et al. | |
| 11,331,984 | B2 | 5/2022 | Gustafson | |
| 11,858,411 | B2 | 1/2024 | Snider | |
| 2002/0152686 | A1 | 10/2002 | Whitehead | |
| 2006/0092658 | A1 | 5/2006 | Scholz | |
| 2007/0217213 | A1 | 9/2007 | Chang | |
| 2008/0127563 | A1 | 6/2008 | Tooker | |
| 2008/0155902 | A1 | 7/2008 | Kaiser | |
| 2010/0149826 | A1 | 6/2010 | Leese et al. | |
| 2014/0047772 | A1 | 2/2014 | Hulst | |
| 2015/0314672 | A1 | 11/2015 | Lahnala | |
| 2018/0079379 | A1 | 3/2018 | Snider et al. | |
| 2019/0383084 | A1 | 12/2019 | Snider et al. | |
| 2021/0296530 | A1 | 9/2021 | Bailey | |
| 2022/0097495 | A1 * | 3/2022 | Snider | B60J 1/18 |

* cited by examiner

VEHICULAR REAR WINDOW ASSEMBLY WITH INTEGRATED CHMSL, CARGO LIGHT AND IN-CABIN LIGHT

CROSS REFERENCE TO RELATED APPLICATION

The present application claims the filing benefits of U.S. provisional application Ser. No. 63/593,660, filed Oct. 27, 2023, which is hereby incorporated herein by reference in its entirety.

FIELD OF THE INVENTION

The present invention relates to a rear window assembly for a vehicle and, more particularly, a rear window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. The slidable window panel may be driven or moved by a cable drive system.

SUMMARY OF THE INVENTION

A vehicular rear window assembly, such as a vehicular rear slider window assembly or a vehicular rear fixed window assembly, includes a window panel having an inner side and an outer side. A lighting device includes a housing portion that is configured for attachment at and along an upper region of the inner side of the window panel. The vehicular rear window assembly, with the housing portion adhesively attached at and along the upper region of the inner side of the window panel, is configured for mounting at a rear portion of a cabin of a vehicle. With the vehicular rear window assembly mounted at the rear portion of the interior cabin of the vehicle, the inner side faces toward the interior cabin of the vehicle and the outer side faces exterior of the vehicle. The housing portion of the lighting device accommodates (i) a first light source arranged on a first circuit element and electrically operable to emit light, (ii) a second light source arranged on a second circuit element and electrically operable to emit light and (iii) a heat sink that is in thermally conductive connection with the first circuit element and the second circuit element. The first light source, when electrically operated to emit light, emits light that passes through the window panel and that is viewable by a person viewing the vehicular rear window assembly from exterior and rearward of the vehicle. The second light source, when electrically operated to emit light, emits light that illuminates at least a portion of the interior cabin of the vehicle. The heat sink draws heat from the first circuit element that is generated when the first light source is electrically operated to emit light and dissipates heat to the housing portion of the lighting device. The heat sink draws heat from the second circuit element when the second light source is electrically operated to emit light and dissipates heat to the housing portion of the lighting device.

These and other objects, advantages, purposes and features of the present invention will become apparent upon review of the following specification in conjunction with the drawings.

BRIEF DESCRIPTION OF THE DRAWINGS

FIG. 10 is an exploded view of the lighting device; and

DESCRIPTION OF THE PREFERRED EMBODIMENTS

Figure 1:
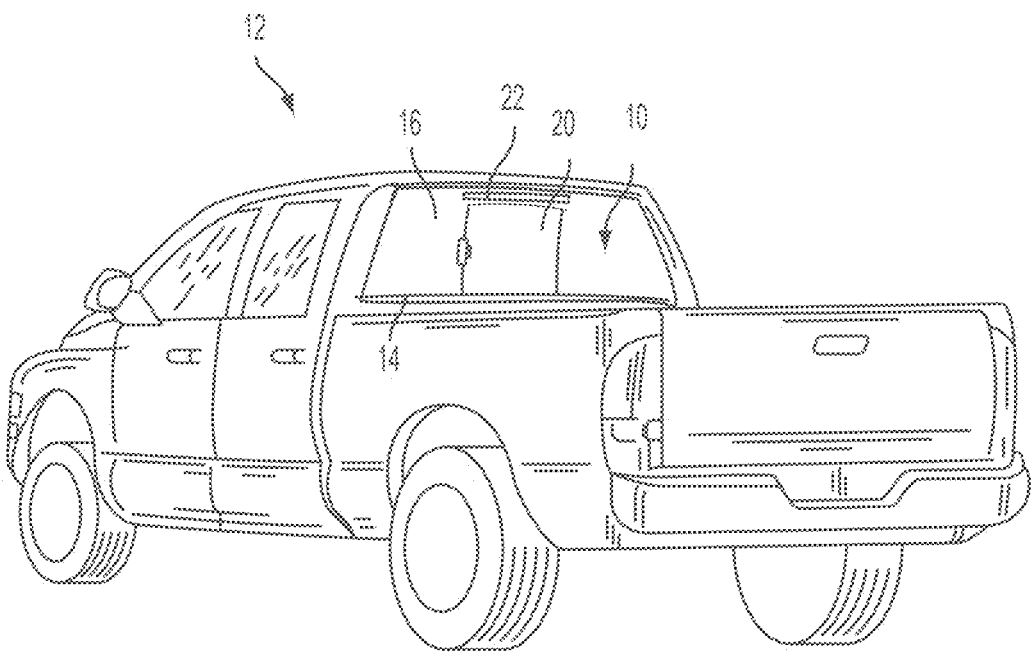
FIG. 1 is a rear perspective view of a pickup truck having a rear slider window assembly.
Figure 2:
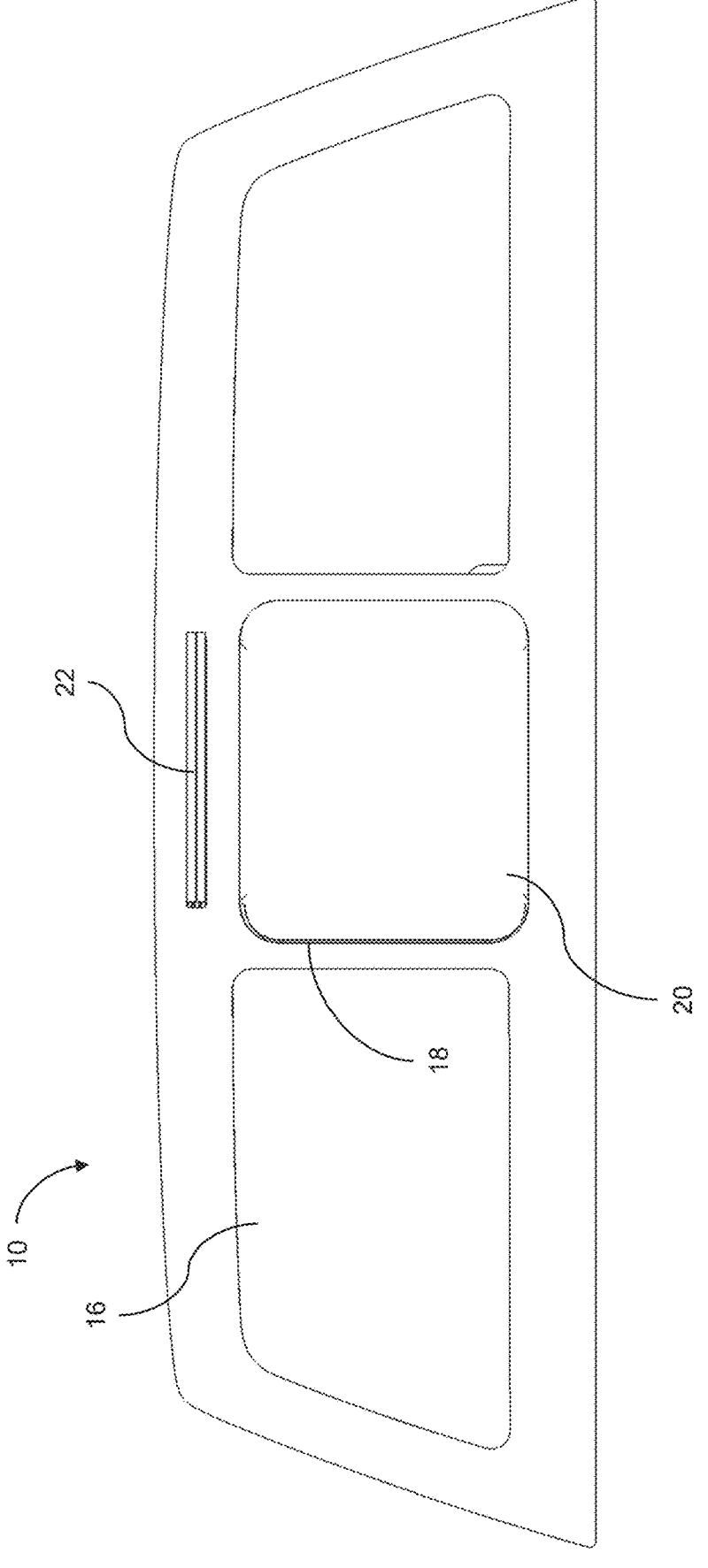
FIGS. 2 and 3 are views of an exterior side of the rear slider window assembly.
Figure 3:
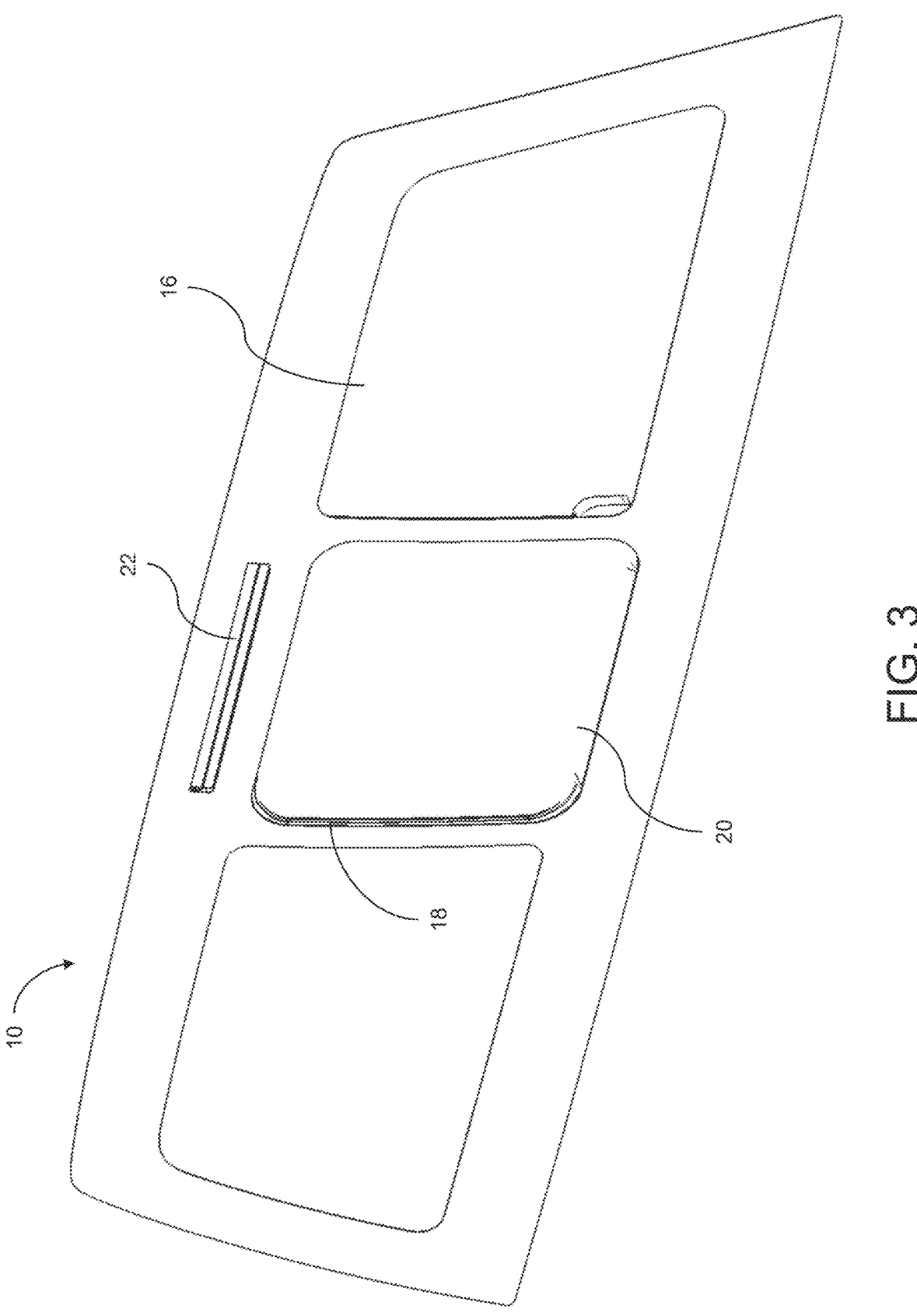
Figure 4:
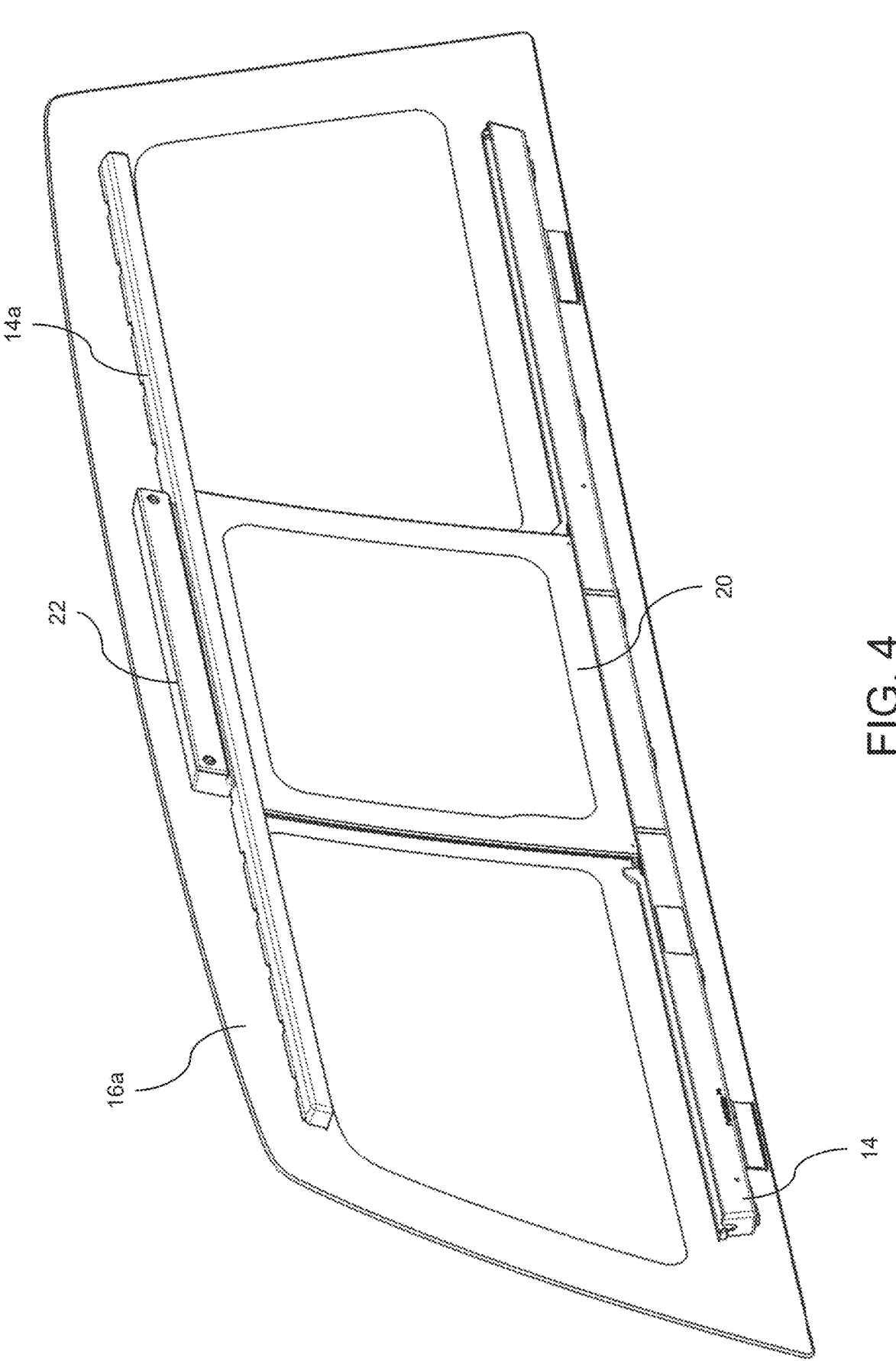
FIGS. 4 and 5 are views of an interior side of the rear slider window assembly.

Referring now to the drawings and the illustrative embodiments depicted therein, a rear slider window assembly 10 of a vehicle 12 (such as a pickup truck or the like) includes a window frame 14, a fixed window panel 16 (or panels) having an aperture 18 that separates side window panels or portions and a movable window panel 20 that is movable relative to the window frame 14 and the fixed window panel 16 between a closed position, where the movable window panel 20 is disposed at the aperture 18 of the fixed window panel 16, and an opened position, where the movable window panel 20 is moved at least partially along the fixed window panel 16 (FIG. 1). The window assembly 10 includes a lighting system having a lighting device 22 disposed at the glass window panel 16 and above and along a center region of an upper rail 14a of the frame 14 (FIG. 4). The lighting device 22, when activated, emits light that is viewable through the window panel 16 and exterior of the vehicle. Optionally, the window panel 16 includes an aperture or notched or cutout region along an upper perimeter portion of the window panel 16 and the lighting device 22 is disposed at or within or behind the aperture or cutout region for emitting light through the aperture and exterior the vehicle 12.

In the illustrated embodiment, the window assembly 10 comprises a hole-in-glass window configuration, where a single fixed glass panel 16 has the aperture or hole or opening 18 established therethrough to define separate spaced apart fixed window panels or panel portions, such as in a similar manner as the window assemblies described in U.S. Pat. No. 8,881,458, which is hereby incorporated herein by reference in its entirety. Optionally, the window assembly may include two fixed window panels that are spaced apart so as to define the opening 18 therebetween. The fixed window panels may comprise two separate spaced apart fixed window panels that define the opening 18 therebetween (and with upper and lower appliqués or trim or filler panels or elements disposed at the upper and lower regions of the opening 18 and between the fixed window panels, and optionally with the lighting device 22 disposed at or within the upper appliqué or the like).

The frame 14 comprises an upper rail and a lower rail, with the upper and lower edge regions of the movable window panel 20 movably or slidably received in and along the respective upper and lower rails. The slider or movable window panel 20 is movable along the lower rail and upper rail of the frame portion 14 to open and close the aperture or opening 18. For example, the slider window panel 20 may be disposed at a lower carrier, which may receive the lower perimeter edge region of the slider window panel 20 therein and may be slidably or movably received in the channel portion of the lower rail of the frame portion 14. The upper rail may comprise any suitable channel or rail element configured to slidably receive an upper edge portion of the movable window panel 20, and the upper rail may comprise a unitarily formed upper rail or channel.

The lighting device 22 may comprise a center high mounted stop lamp (CHMSL) for the vehicle whereby the lighting system may actuate the lighting device 22 to emit light that is viewable exterior of the vehicle by people and other vehicles rearward of the equipped vehicle as part of a brake light system of the vehicle 12. Optionally, the lighting device 22 may comprise a plurality of exterior-facing white light emitting lights that are electrically operable to emit white light exterior of the vehicle and in a generally rearward and downward direction from the upper edge region of the window assembly 10, whereby the lighting system may actuate the lighting device 22 as part of a truck bed illumination system. Optionally, the lighting device 22 may comprise a plurality of interior-facing white light emitting lights that are electrically operable to emit white light toward an interior cabin of the vehicle whereby the lighting system may actuate the lighting device as part of an interior cabin illumination system or the like, as discussed below. Thus, the lighting device 22, when activated, may emit light visible through the window panel 16 and viewable at the exterior of the vehicle and/or at the interior of the vehicle. Optionally, the emitted light may illuminate an exterior portion of the vehicle and/or an interior portion of the interior cabin of the vehicle. The lighting device and window assembly may utilize aspects of the lighting devices and window assemblies described in U.S. Pat. Nos. 10,668,868, 10,559,153, 10,427,503 and/or 9,896,026 and/or U.S. Publication Nos. US-2022-0072992 and/or US-2021-0296530, which are hereby incorporated herein by reference in their entireties.

Figure 5:
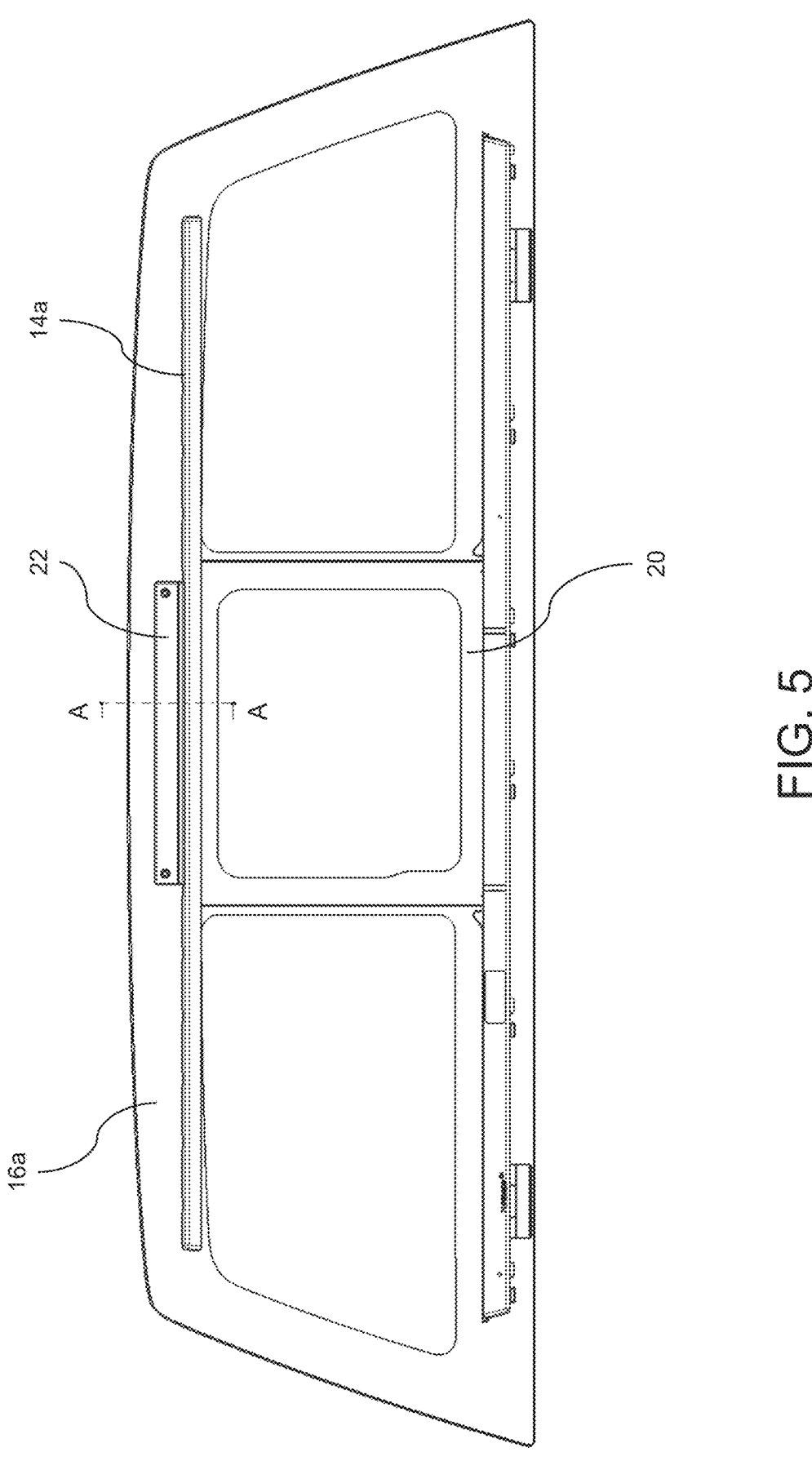
Figure 6:
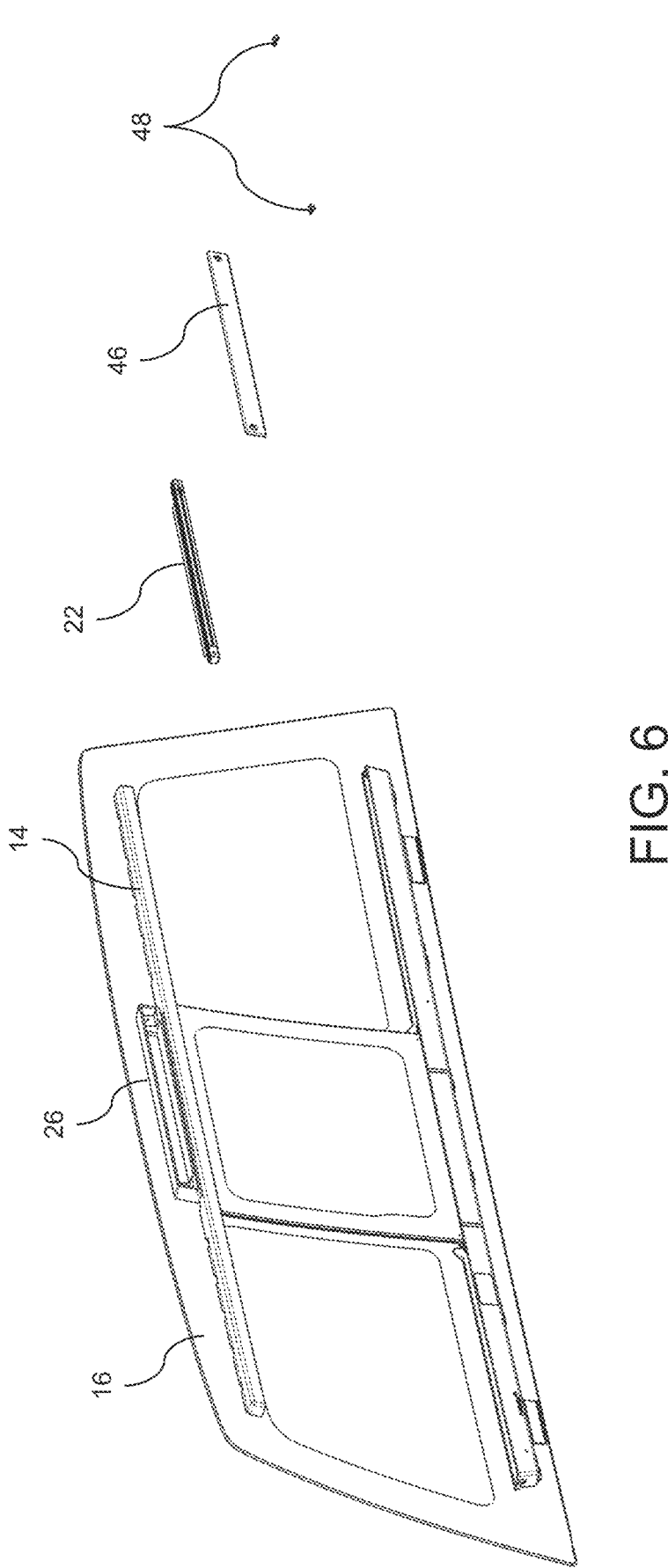
FIG. 6 is an exploded view of the rear slider window assembly and a lighting device of the rear slider window assembly.
Figure 7:
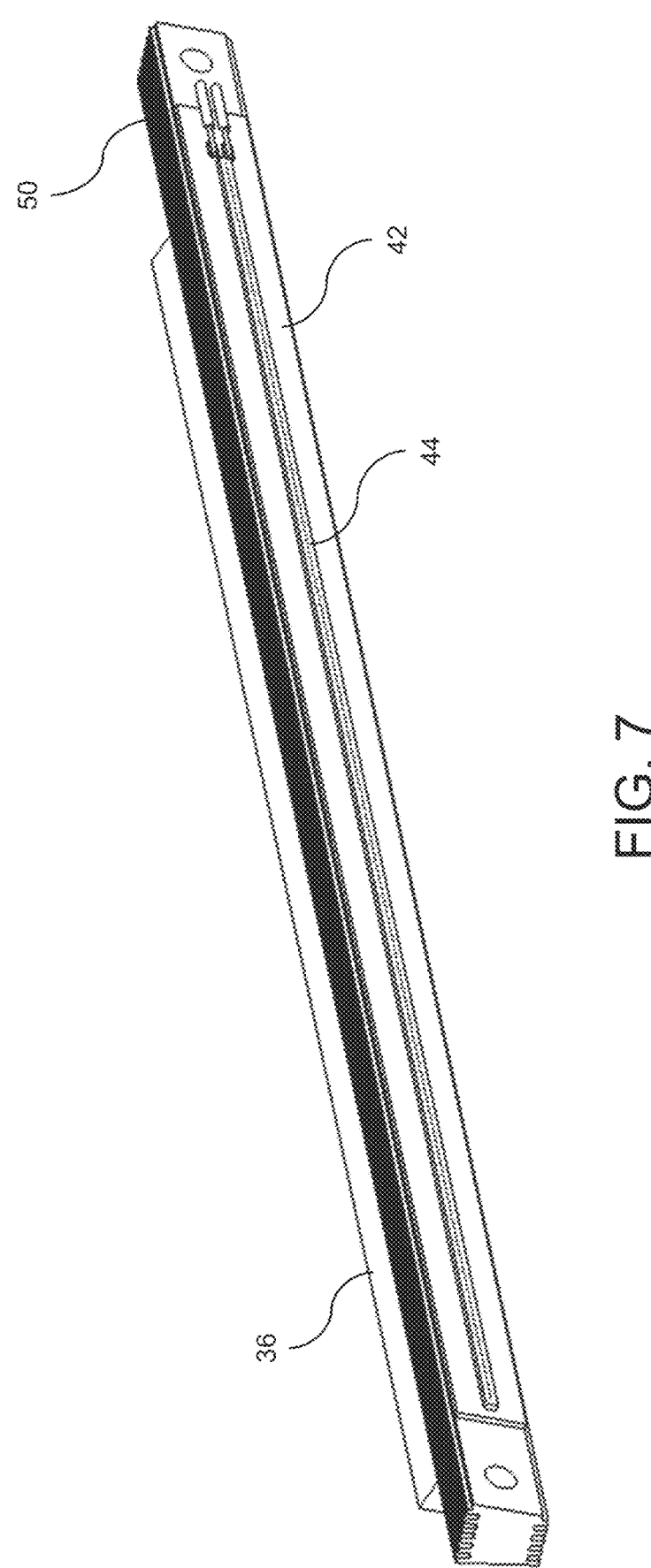
FIGS. 7-9 are views of the lighting device.
Figure 8:
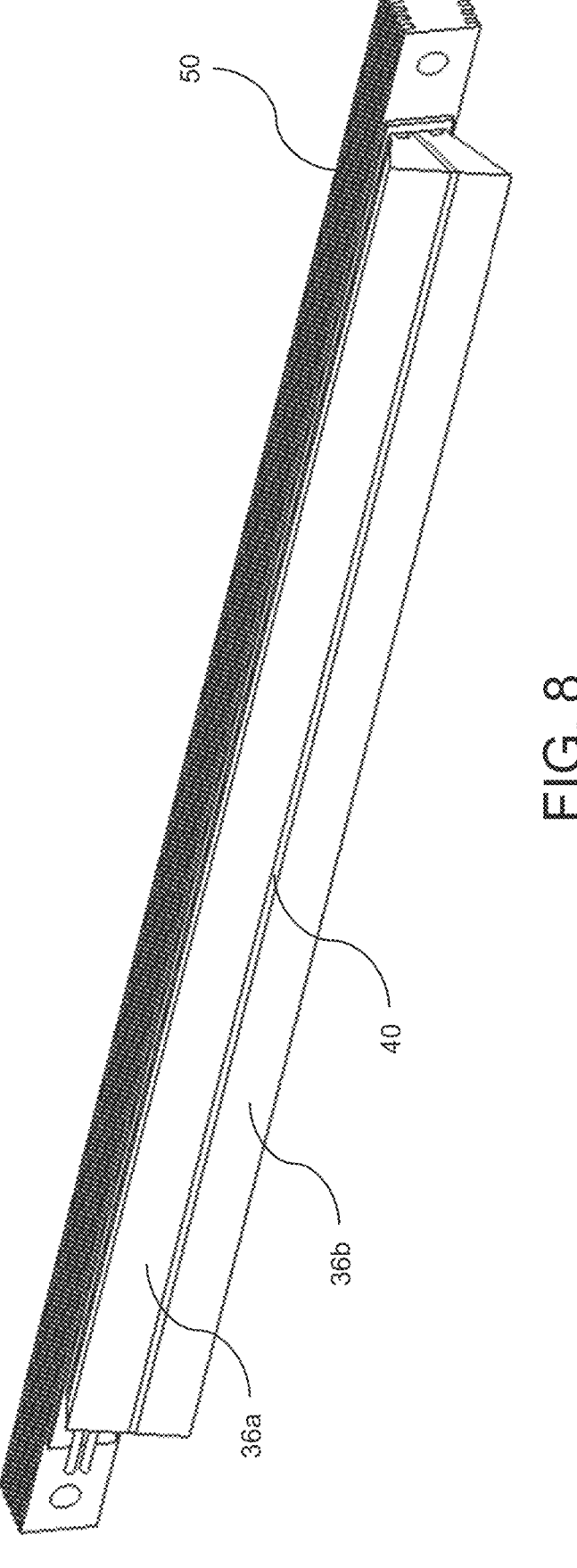

Referring to FIGS. 2-10, the lighting device 22 is disposed at an interior cabin-facing side 16a of the fixed window panel 16 along a central region of an upper perimeter portion of the fixed window panel 16. The lighting device 22 may be mounted at or attached to or integrated with the upper rail 14a of the frame 14. For example, the upper rail 14a may include a channel portion 24 configured to receive the upper edge of the movable window panel 20 therein and a housing portion 26 configured to accommodate the lighting device 22 and position the lighting device 22 at the interior side 16a of the fixed window panel 16 (FIGS. 4-6). With the upper rail 14a attached at the interior side 16a of the fixed window panel 16 (e.g., adhesively attached at the window panel), the housing portion 26 extends above the channel portion 24 and along the interior side 16a, with an aperture or open side of the housing portion 26 facing the interior side 16a of the fixed window panel 16 to allow the lighting device 22 to emit light toward and that passes through the fixed window panel 16. Optionally, the housing portion 26 includes a lens or cover that is at least partially transparent to visible light and that faces and/or abuts the interior side 16a of the fixed window panel 16 so that light emitted by the lighting device 22 passes through the cover and the window panel 16 to be visible exterior of the vehicle.

Figure 5A:
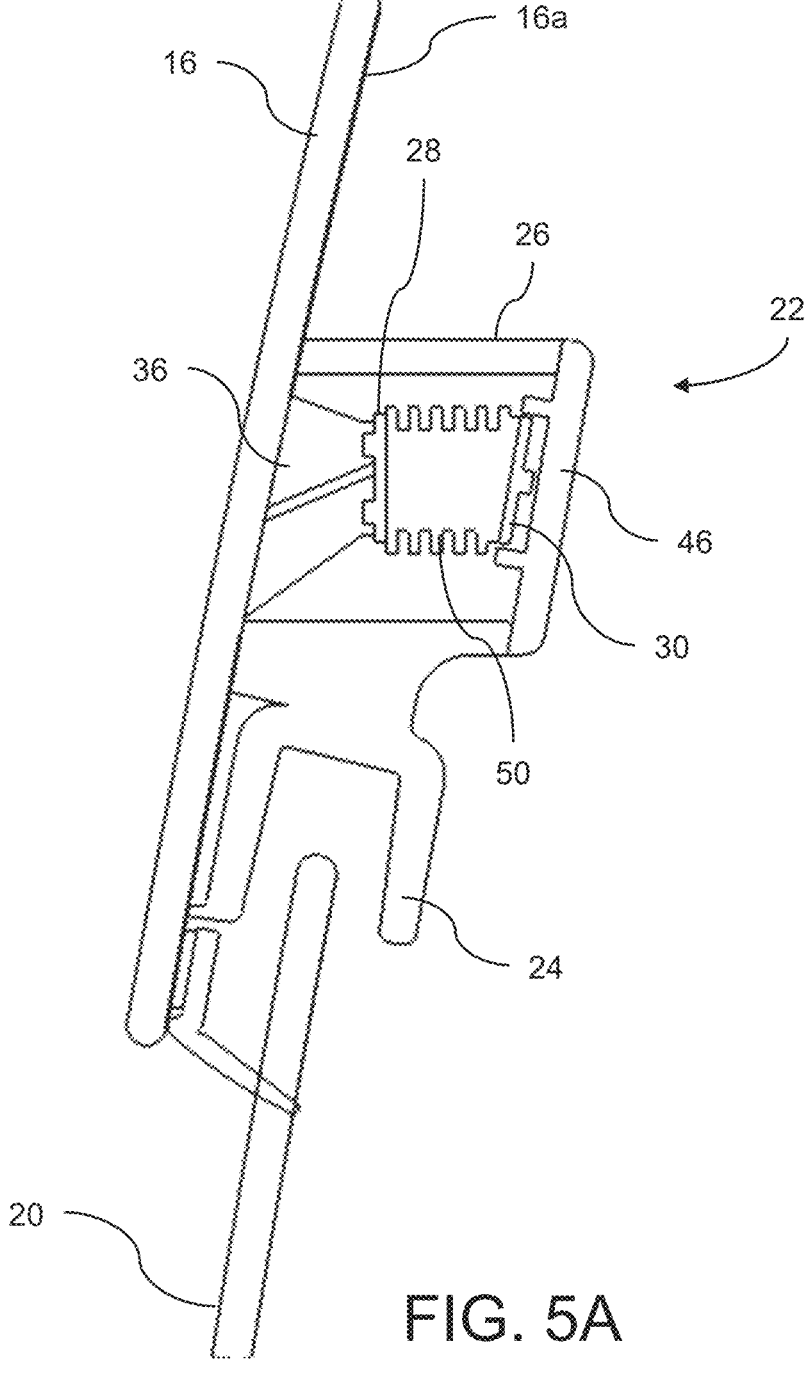
FIG. 5A is a sectional view of the rear slider window assembly taken along line A-A of FIG. 5.

Optionally, and such as shown in FIG. 5A, the housing portion 26 may be integrally formed with the upper rail 14a (such as via the same injection molding and/or extruding process that forms the upper rail 14a), such that the housing portion 26 is attached at the inner surface of the window panel when the upper rail is adhesively bonded at the inner surface of the window panel. The lighting device 22 may be received in the housing portion 26 before or after the upper rail is attached at the window panel. The window panel may have a non-transparent or non-light-transmitting ceramic frit layer or the like disposed at the inner surface of the glass window panel along the upper rail region (and around the rest of the perimeter of the window panel) to render covert the upper rail and housing portion. The region of the window panel where the light emitted by the lighting device passes through may be devoid of the non-light-transmitting layer.

The lighting device 22 includes a first light assembly or first light module 28 that, when electrically powered, emits light toward the interior side 16a of the window panel 16 that passes through the window panel 16 to be viewable exterior the vehicle and/or illuminate a region exterior the vehicle, and the lighting device 22 includes a second light assembly or second light module 30 that, when electrically powered, emits light away from the window panel 16 and toward the interior cabin of the vehicle to illuminate at least a portion of the interior cabin of the vehicle. For example, the first light assembly 28 may be electrically powered to provide the CHMSL function and/or the truck bed illumination function of the lighting system and the second light assembly 30 may be electrically powered to provide the interior cabin illumination function of the lighting system.

Figure 9:
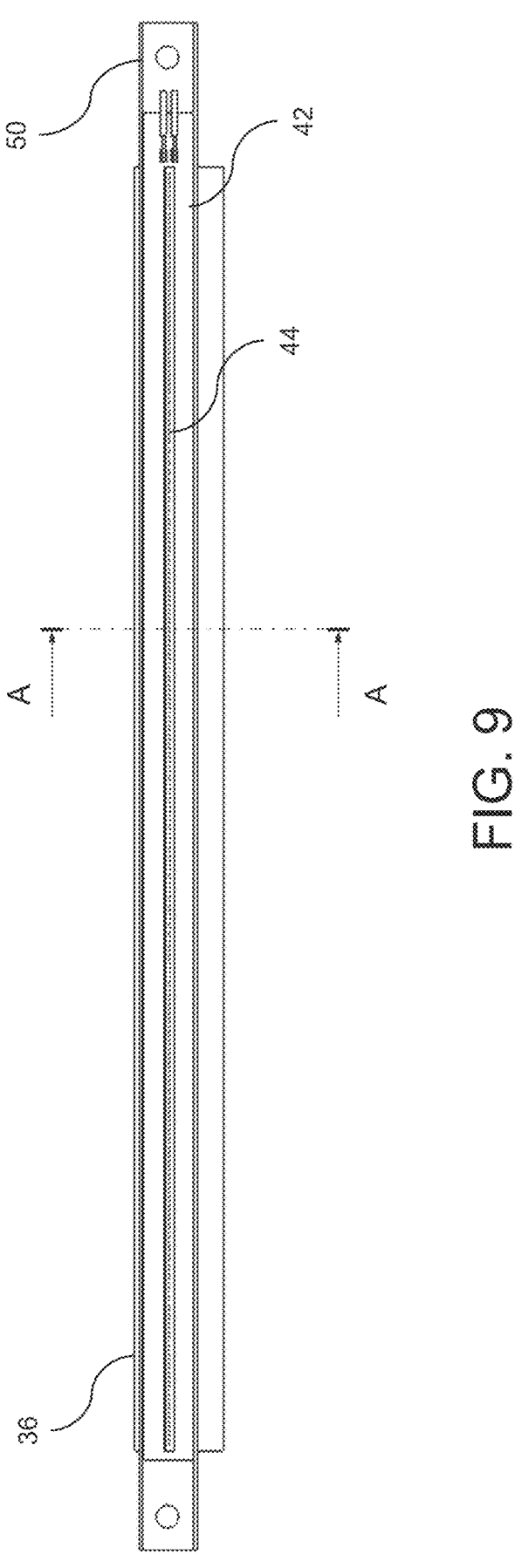
Figure 9A:
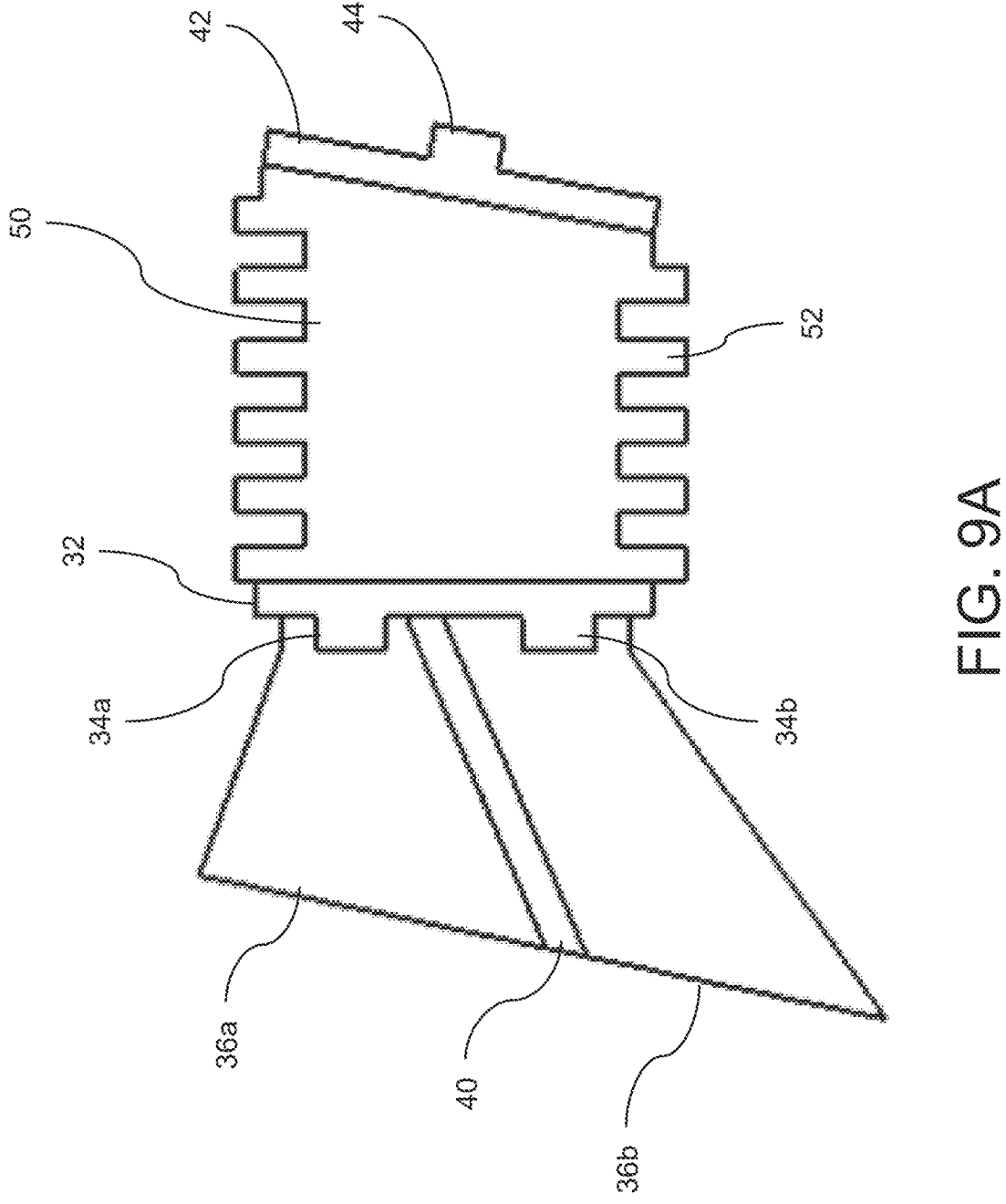
FIG. 9A is a sectional view of the lighting device taken along line A-A of FIG. 9.
Figure 10:
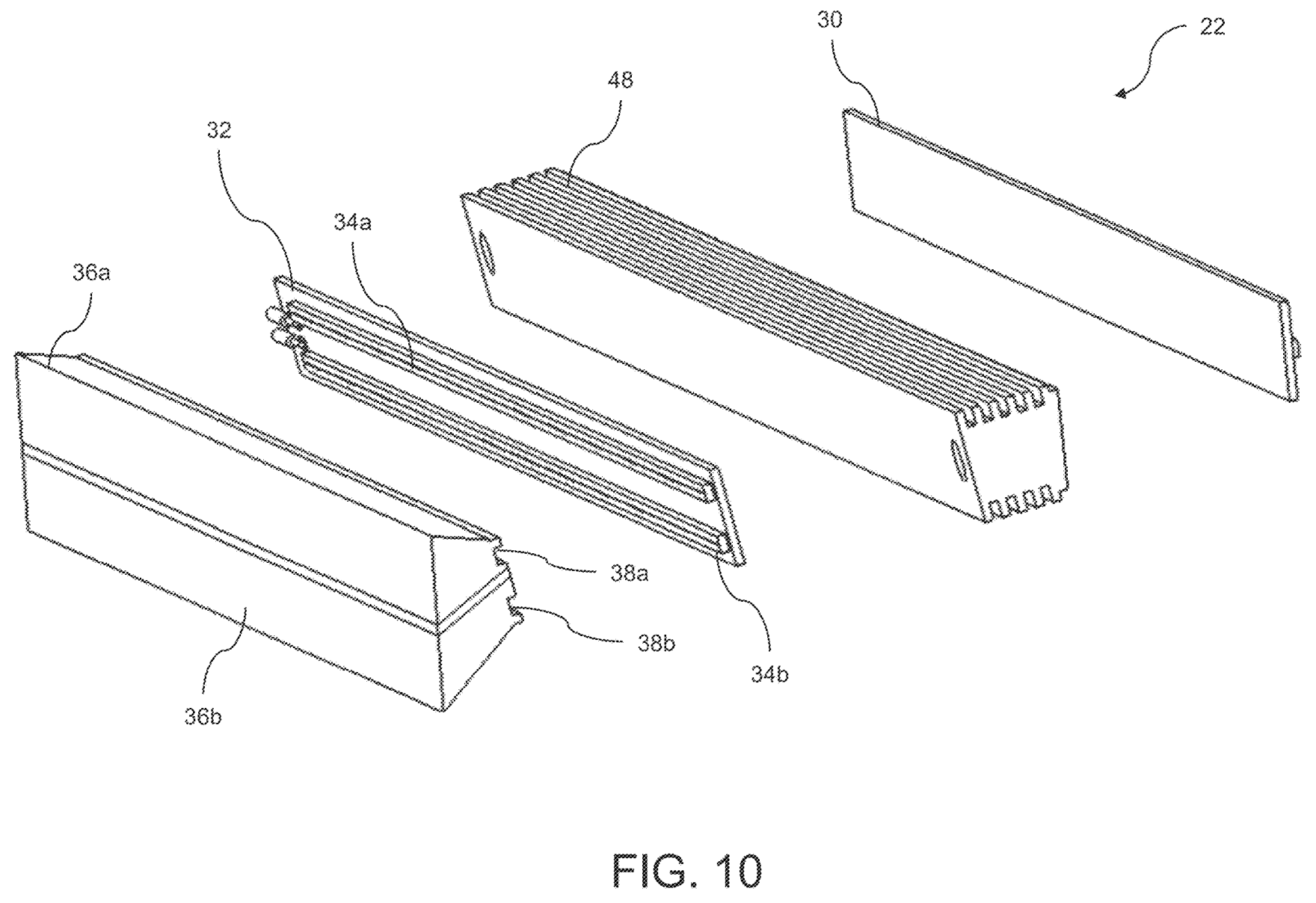

In the illustrated example (and as best shown in FIGS. 9A and 10), the first light assembly 28 includes a printed circuit board (PCB) 32 that accommodates a first light source 34a and a second light source 34b at a first or outer facing side of the PCB 32. For example, the first light source 34a may comprise a light emitting diode (LED) or a plurality of LEDs such as an LED strip, or one or more organic light emitting diodes (OLEDs), or one or more electro-luminescent light sources, or one or more vertical-cavity surface-emitting lasers (VCSELs), disposed along the PCB 32 of the first light assembly 28. The second light source 34b may similarly comprise an LED, or a plurality of LEDs such as an LED strip, or one or more OLEDs, or one or more electroluminescent light sources, or one or more VCESELs extending along the PCB 32 of the first light assembly 28 below the first light source 34a. With the lighting device 22 accommodated within the housing portion 26 of the upper rail 14a, the first light source 34a and the second light source 34b may face the interior side 16a of the window panel 16 for emitting light toward the window panel 16 to be viewable exterior the vehicle, and the light sources may extend above and substantially parallel to the channel portion 24 of the upper rail 14a. That is, the first light source 34a and the second light source 34b may extend substantially parallel to one another along the PCB 32 and along the fixed window panel 16 substantially parallel to the channel portion 24 of the upper rail 14a.

A lens or reflector or optical element or light transmitting element 36 may be disposed between the first light assembly 28 and the interior side 16a of the window panel 16 to direct and/or tint light emitted by the first light source 34a and/or the second light source 34b. For example, a first side or attachment side of the lens 36 may be adhesively attached at the first side of the PCB 32, with respective receiving portions or notches 38*a*, 38*b* extending along the attachment side of the lens 36 and configured to respectively receive the first light source 34*a* and the second light source 34*b* (FIG. 10). A second side of the lens 36 may face the interior side 16*a* of the fixed window panel 16. Thus, light emitted by the first light assembly 28 passes through the lens 36 and the window panel 16 to be viewable exterior the vehicle and/or illuminate a region exterior of the vehicle.

The lens 36 may include a first portion or light guide 36*a* and a second portion or light guide 36*b*. When the first light source 34*a* is aligned with and/or received by the first receiving portion 38*a* and the second light source 34*b* is aligned with and/or received by the second receiving portion 38*b*, light emitted by the first light source 34*a* is directed and/or tinted by the first light guide 36*a* and light emitted by the second light source 34*b* is directed and/or tinted by the second light guide 36*b*. For example, the first light guide 36*a* may be configured to direct light emitted by the first light source 34*a* exterior of the vehicle and at least rearward of the vehicle to be viewable exterior of the vehicle so that light emitted by the light source 34*a* provides the CHMSL brake light function of the lighting system. The first light source 34*a* may emit white light and the first light guide 36*a* may be at least partially opaque and/or tinted so that light that passes through the first light guide 36*a* may appear red (e.g., like a brake light) to a person viewing the lighting device 22 exterior the vehicle. Optionally, the first light source 34*a* may emit colored light (e.g., red light) and the first light guide 36*a* may be non-tinted. In some examples, the first light source 34*a* may emit white light and the first light guide 36*a* may be non-tinted, with a colored or tinted or at least partially opaque film or layer disposed at a portion of the window panel 16 aligned with the first light guide 36*a* for coloring or tinting light emitted by the first light source 34*a*.

The second light guide 36*b* may be configured to direct light emitted by the second light source 34*b* exterior of the vehicle and at least rearward of the vehicle and at least partially downward to illuminate at least a portion of a bed of the vehicle so that light emitted by the second light source 34*b* provides the bed illumination function of the lighting system. The second light source 34*b* may emit white light (or any suitable color light) and the second light guide 36*b* may be non-tinted or transparent. Optionally, the second light guide 36*b* is at least partially opaque or tinted to tint or reduce brightness of light emitted by the second light source 34*b*. A light barrier 40 may extend along the lens 36 between the first light guide 36*a* and the second light guide 36*b* to prevent or preclude light from crossing between the respective light guides.

Thus, the first light source 34*a* and the second light source 34*b* may be disposed on the planar first side of the PCB 32. The respective light sources are operated in response to respective inputs (e.g., a brake input activates the CHMSL function of the lighting device and a user input activates the bed illumination function of the lighting device) and are configured to direct light in different directions relative to one another. For example, the first light source 34*a* provides the CHMSL function and thus emits light rearward of the vehicle and that is directed substantially horizontal to the ground surface or longitudinal axis of the vehicle, while the second light source 34*b* provides the truck bed illumination function and thus emits light rearward of the vehicle and that is directed at least partially downward toward the bed of the vehicle. The lens or light guide 36 disposed between the first light assembly 28 and the interior side 16*a* of the window panel 16 directs and/or tints light emitted by the first light assembly for the respective functions. For example, the lens 36 includes a first light guide 36*a* and a second light guide 36*b* that direct light along respective primary paths or fields of illumination, where the first light guide 36*a* may direct light substantially perpendicular to the planar PCB 32 and/or window panel 16 and/or longitudinal axis of the vehicle and the second light guide 36*b* may direct light at an oblique angle relative to the planar PCB 32 and substantially downward from the upper portion of the window assembly toward the vehicle bed. In other words, the first light source 34*a* and the second light source 34*b* may emit light along primary axes that are substantially parallel to one another (e.g., perpendicular to the planar PCB 32), with the first light guide 36*a* and the second light guide 36*b* directing the emitted light in different directions or at different angles relative to the planar PCB 32. For example, the first light guide 36*a* may primarily direct the light emitted by the first light source 34*a* in a direction that is generally perpendicular to the planar PCB 32 and the second light guide 36*b* may primarily direct the light emitted by the second light source 34*b* in a direction that is at an acute angle relative to the planar PCB 32 (or at a smaller acute angle compared to the light directed by the first light guide).

The second light assembly 30 includes a respective PCB 42 that accommodates a light source 44 at a first or outer facing side of the PCB 42. For example, the light source 44 may comprise an LED, or a plurality of LEDs such as an LED strip, or one or more OLEDs, or one or more electro-luminescent light sources, or one or more VCESELs extending along the PCB 42. With the lighting device 22 accommodated within the housing portion 26 of the upper rail 14*a*, the light source 44 may face away from the window panel 16 and toward the interior cabin of the vehicle for emitting light toward the interior cabin of the vehicle and illuminating at least a portion of the interior cabin. The light source 44 may extend substantially parallel to the channel portion 24 of the upper rail 14*a*.

The PCB 42 and/or the light source 44 may be tilted or directed at least partially downward from the upper portion of the window assembly so that, when the light source 44 is electrically operated, light emitted by the light source 44 is directed at least partially downward toward the interior cabin of the vehicle to illuminate at least a portion of the interior cabin. For example, light emitted by the light source 44 may provide a dome light function or a reading light function of the lighting system.

A lens or cover element 46 (FIGS. 5A and 6) may attach to the housing portion 26 and extend over and along the light source 44. For example, the lens 46 may snap attach at the housing portion 26 or attach to the housing portion 26 via threaded fasteners 48 received through the lens 46 and at the housing portion 26. The lens 46 may direct and/or tint light emitted by the light source 44 as the light passes through the lens 46 and toward the interior cabin of the vehicle.

A second side of the PCB 32 opposite the side at which the first light source 34*a* and the second light source 34*b* are disposed is thermally coupled to a heat sink or heat dissipating device 50 of the lighting assembly 22. For example, the PCB 32 is adhesively attached at a first side of the heat sink 50 (e.g., via a thermally conductive paste or glue). Further, a second side of the PCB 42 opposite the side at which the light source 44 is disposed is thermally coupled to the heat sink 50 spaced from and remote from the PCB 32. For example, the PCB 42 is attached at a second side of the heat sink 50 opposite the first side (e.g., via a thermally conductive paste or glue).

In other words, the lighting assembly 22 includes the heat sink 50 extending along the housing portion 26 of the upper rail 14a and disposed between the PCB 32 and the PCB 42. The PCB 32 with the CHMSL light source 34a and the cargo light source 34b is disposed at the first side of the heat sink 50 and the PCB 42 with the interior light source 44 is disposed at the second side of the heat sink 50. A thickness of the heat sink 50 separates the first PCB 32 and the second PCB 42. When the respective light sources are electrically operated to emit light, heat generated by the light sources at the first and second PCBs is drawn away from the light sources and the respective PCBs by the heat sink 50 to be dissipated out of the housing portion 26.

For example, the heat sink 50 comprises a thermally conductive material, such as copper or aluminum, and includes a plurality of heat dissipating fins 52 extending along the heat sink 50 within a cavity of the housing portion 26. In the illustrated example of FIGS. 9A and 10, the heat dissipating fins 52 extend along respective upper and lower surfaces of the heat sink 50 and substantially parallel to the channel portion 24 of the upper rail 14a, with the PCB 32 attached at a first lateral side of the heat sink 50 and the PCB 42 attached at a second lateral side of the heat sink 50 opposite the first lateral side. Heat drawn away from the PCBs to the heat sink 50 may be dissipated from the heat dissipating fins 52 to air within the cavity of the housing portion 26, where the heat may be dissipated through the upper rail portion 14a to the fixed window panel 16 and/or interior cabin of the vehicle. For example, vents or slots may be formed through the housing portion 26 (e.g., along an upper surface of the housing portion or at opposing ends of the housing portion) to allow airflow to pass between the cavity of the housing portion 26 and the interior cabin of the vehicle for dissipating heat from the heat sink 50. Optionally, an airflow source such as an electrically operable fan may generate cooling airflow within the cavity of the housing portion 26 to direct airflow along the fins 52 of the heat sink 50 and through the vents of the housing portion 26 for dissipating heat from the heat sink 50 to the interior cabin of the vehicle.

The lateral sides of the heat sink 50 may be angled relative to one another to position the PCBs and light sources for emitting light toward their intended targets (FIGS. 5A and 9A). For example, with the light assembly 22 accommodated within the housing portion 26, the first lateral side of the heat sink 50 may be substantially vertical and the second lateral side of the heat sink 50 may be at an oblique angle relative to the first side so that the PCB 42 and light source 44 of the second light assembly 30 are angled at least partially downward from the upper portion of the window panel 16.

Thus, the lighting assembly 22 includes the first PCB 32 accommodating the first light source 34a and the second light source 34b and the second PCB 42 accommodating the third light source 44. The first PCB 32 is disposed at the first side of the heat sink 50 and the second PCB 42 is disposed at the second side of the heat sink 50 opposite the first side. The lens or light guide 36 is disposed at the first PCB 32 so that the first light source 34a emits light that passes through the first light guide portion 36a of the light guide 36 and the second light source 34b emits light that passes through the second light guide portion 36b of the light guide 36.

When the light assembly 22 is accommodated within the housing portion 26 along the upper perimeter region of the fixed window panel 16, the light guide 36 is disposed along the interior side 16a of the window panel 16 and the light sources 34a, 34b at the first PCB 32 face the interior side 16a of the window panel 16 and the light source 44 at the second PCB 42 faces away from the window panel 16. The first side of the heat sink 50 may be configured so that a plane of the first PCB 32 is substantially vertical when the lighting assembly 22 is disposed at the window assembly and the light sources 34a, 34b emit light along primary paths or fields of illumination substantially perpendicular to the PCB 32 and substantially parallel to the ground surface. The light guide 36 may direct light emitted by the light sources 34a, 34b toward the window panel 16 and at respective oblique angles relative to the PCB 32 to provide the respective fields of illumination rearward of the vehicle. For example, the second light guide portion 36b may direct light emitted by the second light source 34b generally downward toward the bed of the vehicle to provide the bed illumination function of the lighting system. A plane of the second side of the heat sink 50 may be at an oblique angle relative to the first side so that the light source 44 at the second PCB 42 may be directed at least partially downward and emit light that illuminates at least a portion of the interior cabin of the vehicle. The heat sink 50 includes the plurality of heat dissipating fins 52 for drawing heat away from the PCBs and the light sources.

The lighting device 22 may be attached or integrated with the window panel 16, such that the window panel 16 with lighting device 22 is installed at the vehicle as a unit, whereby the lighting device 22 is electrically connected to a vehicle wire harness or the like for power and control (such as by an electronic control module or the like of the vehicle at which the window assembly is installed). When the lighting device 22 is not activated, the lighting device 22 may be covert and not readily discernible at the exterior side of the window panel 16 (due to a tint or darkening or opaque layer of the window panel). Optionally, the window panel may be tinted or darkened except at the location where the light sources are disposed, with that portion of the window panel (where the light sources are disposed) comprising a transparent or clear or lightly tinted or translucent layer so that light emitted by the light sources passes through the window panel and is viewable by a person viewing the rear window assembly. By avoiding use of a darkened or tinted material at the light sources, reduced power light sources may be used since they do not have to emit light through a darkened or tinted portion of the window panel.

The lighting device 22 may have an electrical lead or connector for electrically connecting to a wiring harness of the vehicle and/or circuitry of the vehicle (such as brake light wiring or circuitry and/or such as a user input and a power source and/or the like) via any suitable means. For example, the lighting device 22 may electrically connect to a connector disposed at the upper region of the window assembly and near or in the upper rail portion 14a, whereby a wiring harness or wire of the vehicle may electrically connect to the connector at the upper rail portion 14a. Optionally, the lighting device 22 may electrically connect to a conductive trace or busbar that extends along the fixed window panel 16 to a connector at a side or lower region of the window assembly, whereby a wiring harness may connect to the connector and to connectors for a heater grid of the window assembly at a common connecting area of the window assembly. Optionally, the lighting device may include a wire or lead that extends from the device and may be routed along or behind the upper rail portion 14a to a side region of the window assembly for electrical connection to a wiring harness or wire of the vehicle.

The window panel may comprise a glass window panel, such as transparent tempered glass window panel or the like.

Figure 11:
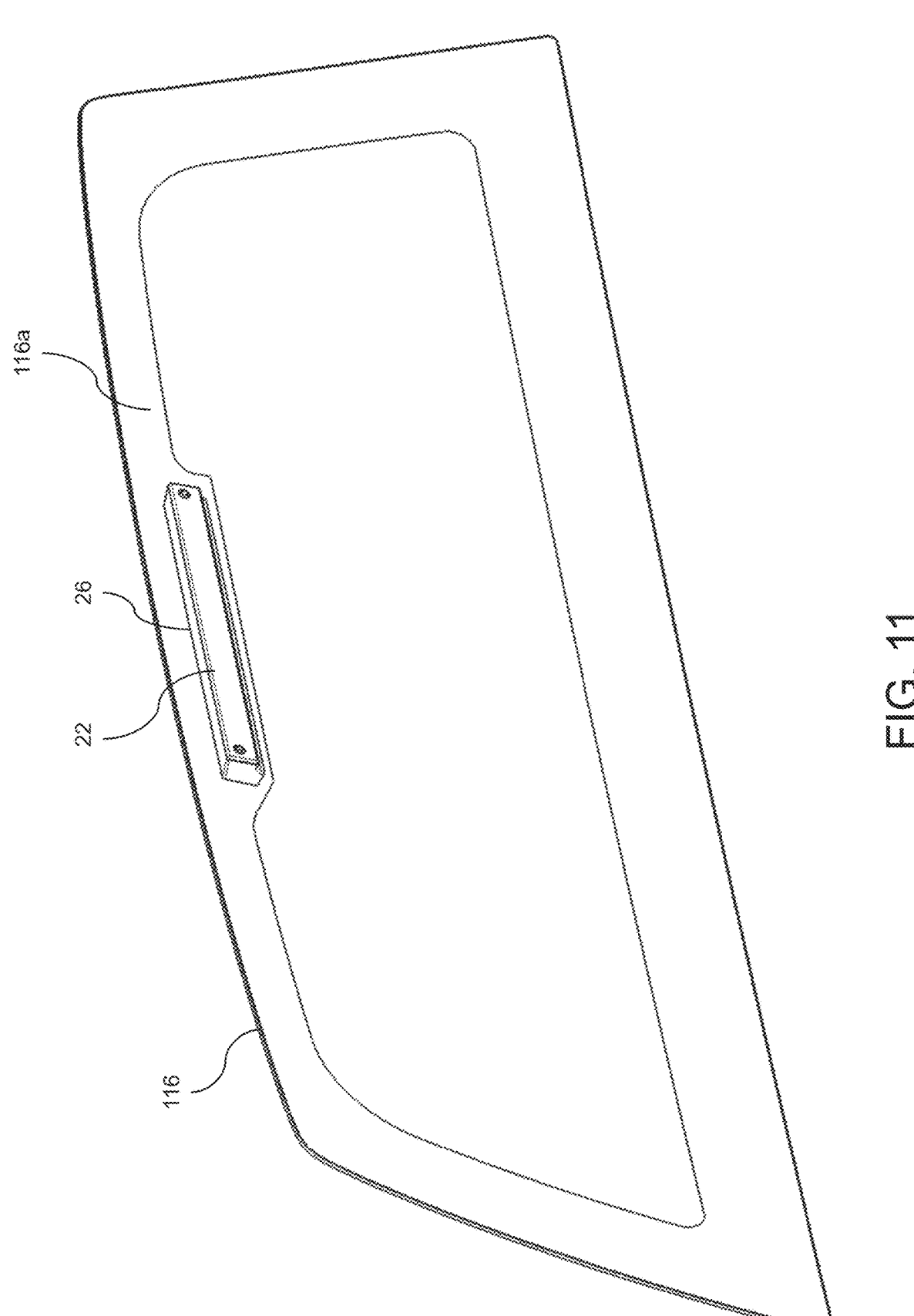
FIG. 11 is a perspective view of the lighting device disposed at an interior side of a fixed panel window assembly.

Optionally, the window panel may comprise a non-glass material, such as a transparent or substantially transparent plastic or polymeric or acrylic material or the like. Although shown and described as a vehicular rear slider window assembly configured to be disposed at the rear portion of a cabin of a pickup truck, the window assembly may be suitable for other rear windows (such as a liftgate window such as for a hatchback vehicle or van or the like) or side windows (such as fixed side window panels or tilt-to-open side window panels for an SUV or van or the like). For example, and such as shown in FIG. 11, the lighting assembly 22 may be disposed within the housing portion 26 that is attached at (e.g., adhesively attached at) the interior side 116*a* of a fixed window panel 116 of a vehicle. For example, the fixed window panel 116 may be disposed at a rear portion of an interior cabin of a pickup truck or SUV that is not equipped with the slider window assembly 10.

The movable window panel 20 may be movable relative to the fixed window panel and the frame 14 via operation of an electrically operable drive system. Optionally, the window assembly or assemblies and drive system may utilize aspects of the window assemblies and drive systems described in U.S. Pat. Nos. 11,331,984; 10,501,977; 8,938,914; 8,915,018; 8,881,458; 8,402,695; 7,073,293; 7,003,916; 6,691,464 and/or 5,799,444, and/or U.S. Publication Nos. US-2021/0355737; US-2014/0047772; US-2008/0127563; US-2006/0107600; US-2004/0020131 and/or US-2003/0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular rear window assembly, the vehicular rear window assembly comprising:

a window panel comprising an inner side and an outer side;

wherein the window panel is configured for mounting at a rear portion of an interior cabin of a vehicle to mount the vehicular rear window assembly at the vehicle, and wherein, with the vehicular rear window assembly mounted at the vehicle, the inner side of the window panel faces toward the interior cabin of the vehicle and the outer side of the window panel faces exterior of the vehicle;

a lighting device attached at an upper region of the inner side of the window panel, wherein the lighting device comprises a housing portion;

wherein the housing portion of the lighting device accommodates (i) a first light source arranged on a first circuit element and electrically operable to emit light, (ii) a second light source arranged on a second circuit element and electrically operable to emit light and (iii) a heat sink that is in thermally conductive connection with the first circuit element and the second circuit element;

wherein, with the vehicular rear window assembly mounted at the vehicle, and when the first light source is electrically operated to emit light, the first light source emits light that passes through the window panel and that is viewable by a person viewing the vehicular rear window assembly from exterior and rearward of the vehicle;

wherein the first circuit element is disposed at a first side of the heat sink, and wherein the second circuit element is disposed at a second side of the heat sink, and wherein the first side of the heat sink is opposite the second side of the heat sink, and wherein a thickness of the heat sink extends between the first side of the heat sink and the second side of the heat sink;

wherein the second side of the heat sink is at an oblique angle relative to the first side of the heat sink;

wherein, with the vehicular rear window assembly mounted at the vehicle, and when the second light source is electrically operated to emit light, the second light source emits light that illuminates an interior portion of the interior cabin of the vehicle;

wherein the heat sink draws heat from the first circuit element when the first light source is electrically operated to emit light; and wherein the heat sink draws heat from the second circuit element when the second light source is electrically operated to emit light.

2. The vehicular rear window assembly of claim 1, wherein a third light source is arranged on the first circuit element and electrically operable to emit light, and wherein, with the vehicular rear window assembly mounted at the vehicle, and when the third light source is electrically operated to emit light, the third light source emits light that passes through the window panel to illuminate at least a portion of a bed of the vehicle.

3. The vehicular rear window assembly of claim 2, wherein the lighting device comprises a light guide that includes (i) a first portion disposed between the first light source and the inner side of the window panel and (ii) a second portion disposed between the third light source and the inner side of the window panel, and wherein the first portion of the light guide directs light emitted by the first light source to pass through the window panel and the second portion of the light guide directs light emitted by the third light source to pass through the window panel.

4. The vehicular rear window assembly of claim 3, wherein the first portion of the light guide directs light emitted by the first light source to pass through the window panel at a first angle relative to a plane of the first circuit element, and wherein the second portion of the light guide directs light emitted by the third light source to pass through the window panel at a second angle relative to the plane of the first circuit element, and wherein the second angle is different from the first angle.

5. The vehicular rear window assembly of claim 4, wherein the first angle is perpendicular to the plane of the first circuit element, and wherein the second angle is an oblique angle relative to the plane of the first circuit element.

6. The vehicular rear window assembly of claim 3, wherein, with the vehicular rear window assembly mounted at the vehicle, the second portion of the light guide directs light emitted by the third light source to pass through the window panel and at least partially downward from the upper region of the inner side of the window panel.

7. The vehicular rear window assembly of claim 1, wherein a cover element is disposed at the housing portion of the lighting device, and wherein, with the vehicular rear window assembly mounted at the vehicle, the second light source emits light that passes through the cover element to illuminate the interior portion of the interior cabin of the vehicle.

8. The vehicular rear window assembly of claim 1, wherein the first side of the heat sink faces toward the inner side of the window panel, and wherein the second side of the heat sink faces toward the interior cabin of the vehicle.

9. The vehicular rear window assembly of claim 1, wherein an upper side of the heat sink and a lower side of the heat sink extend between the first side of the heat sink and the second side of the heat sink, and wherein respective heat dissipating fins extend along the upper side of the heat sink and along the lower side of the heat sink.

10. The vehicular rear window assembly of claim 1, wherein, with the vehicular rear window assembly mounted at the vehicle, the first light source of the lighting device is electrically operated to emit light responsive to actuation of a brake system of the vehicle to provide a center high mounting stop lamp feature of the vehicle.

11. The vehicular rear window assembly of claim 1, wherein, with the vehicular rear window assembly mounted at the vehicle, the first light source of the lighting device is electrically operated to emit light responsive to actuation of a user actuatable input, and wherein the first light source emits light that passes through the window panel to illuminate at least a portion of a bed of the vehicle.

12. The vehicular rear window assembly of claim 1, wherein the first light source and the second light source each comprise a plurality of light emitting diodes (LEDs) arranged on the respective first and second circuit elements.

13. The vehicular rear window assembly of claim 1, wherein the first light source and the second light source each comprise one selected from the group consisting of (i) one or more light emitting diodes (LEDs), (ii) one or more micro-LEDs, (iii) one or more organic light emitting diodes (OLEDs), (iv) one or more electro-luminescent light sources and (v) one or more vertical-cavity surface-emitting lasers (VCSELs).

14. The vehicular rear window assembly of claim 1, wherein the vehicle comprises a pickup truck.

15. The vehicular rear window assembly of claim 14, wherein the vehicular rear window assembly comprises a vehicular rear slider window assembly comprising a movable window panel and an upper rail and a lower rail, and wherein the window panel is fixed relative to the upper rail, and wherein the window panel comprises an opening, and wherein the movable window panel is movable along the upper rail and the lower rail, and wherein the movable window panel is movable between a closed position, where the movable window panel is disposed at the opening, and an opened position, where the movable window panel is disposed at least partially along the window panel, and wherein the lighting device is disposed above the opening.

16. The vehicular rear window assembly of claim 15, wherein the housing portion is integrally formed with the upper rail.

17. The vehicular rear window assembly of claim 1, wherein the window panel comprises an aperture at the upper region of the window panel, and wherein the lighting device is disposed at or near the aperture so that, when the first light source is electrically operated to emit light, the first light source emits light that passes through the aperture of the window panel.

18. The vehicular rear window assembly of claim 1, wherein the heat sink draws heat from the first circuit element and the second circuit element and dissipates heat to the housing portion of the lighting device.

19. The vehicular rear window assembly of claim 1, wherein the heat sink draws heat from the first circuit element and the second circuit element and dissipates heat to air within the housing portion of the lighting device.

20. The vehicular rear window assembly of claim 1, wherein the housing portion is adhesively attached at the upper region of the inner side of the window panel to attach the lighting device at the upper region of the inner side of the window panel.

21. The vehicular rear window assembly of claim 20, wherein the vehicular rear window assembly, with the housing portion adhesively attached at the upper region of the inner side of the window panel, is configured for mounting at the rear portion of the interior cabin of the vehicle.

22. A method of assembling a vehicular rear window assembly, the method comprising:

providing a window panel comprising an inner side and an outer side;

providing a lighting device, wherein the lighting device comprises (i) a housing portion, (ii) a first light source arranged on a first circuit element and electrically operable to emit light, (iii) a second light source arranged on a second circuit element and electrically operable to emit light, (iv) a third light source arranged on the first circuit element and electrically operable to emit light and (v) a heat sink that is in thermally conductive connection with the first circuit element and the second circuit element;

wherein the first circuit element is disposed at a first side of the heat sink, and wherein the second circuit element is disposed at a second side of the heat sink, and wherein the first side of the heat sink is opposite the second side of the heat sink, and wherein a thickness of the heat sink extends between the first side of the heat sink and the second side of the heat sink;

wherein the second side of the heat sink is at an oblique angle relative to the first side of the heat sink;

attaching the housing portion at an upper region of the inner side of the window panel;

wherein, with the housing portion of the lighting device attached at the upper region of the inner side of the window panel, the vehicular rear window assembly is configured for mounting at a rear portion of an interior cabin of a vehicle;

wherein, when the first light source is electrically operated to emit light, the first light source emits light that passes through the window panel;

wherein, when the second light source is electrically operated to emit light, the second light source emits light that is directed away from the window panel;

wherein, when the third light source is electrically operated to emit light, the third light source emits light that passes through the window panel at a downward angle relative to light emitted by the first light source;

wherein the heat sink draws heat from the first circuit element (i) when the first light source is electrically operated to emit light and (ii) when the third light source is electrically operated to emit light;

wherein the heat sink draws heat from the second circuit element when the second light source is electrically operated to emit light; and wherein, with the vehicular rear window assembly mounted at the vehicle, the inner side of the window panel faces toward the interior cabin of the vehicle and the outer side of the window panel faces exterior of the vehicle.

23. The method of claim 22, wherein the lighting device comprises a light guide that includes (i) a first portion disposed between the first light source and the inner side of the window panel and (ii) a second portion disposed between the third light source and the inner side of the window panel, and wherein the first portion of the light guide directs light emitted by the first light source to pass through the window panel and the second portion of the light guide directs light emitted by the third light source to pass through the window panel.

24. The method of claim 23, wherein the first portion of the light guide directs light emitted by the first light source to pass through the window panel at a first angle relative to a plane of the first circuit element, and wherein the second portion of the light guide directs light emitted by the third light source to pass through the window panel at a second angle relative to the plane of the first circuit element, and wherein the second angle is different from the first angle.

25. The method of claim 22, wherein the vehicular rear window assembly comprises a vehicular rear slider window assembly comprising a movable window panel and an upper rail and a lower rail, and wherein the window panel is fixed relative to the upper rail, and wherein the window panel comprises an opening, and wherein the movable window panel is movable along the upper rail and the lower rail, and wherein the movable window panel is movable between a closed position, where the movable window panel is disposed at the opening, and an opened position, where the movable window panel is disposed at least partially along the window panel, and wherein the housing portion is integrally formed with the upper rail, and wherein attaching the housing portion at the upper region of the inner side of the window panel comprises attaching the upper rail and the housing portion above the opening.

26. A vehicular rear window assembly, the vehicular rear window assembly comprising:

a window panel comprising an inner side and an outer side;

wherein the window panel is configured for mounting at a rear portion of an interior cabin of a vehicle to mount the vehicular rear window assembly at the vehicle, and wherein, with the vehicular rear window assembly mounted at the vehicle, the inner side of the window panel faces toward the interior cabin of the vehicle and the outer side of the window panel faces exterior of the vehicle;

a lighting device attached at an upper region of the inner side of the window panel, wherein the lighting device comprises a housing portion;

wherein the housing portion of the lighting device accommodates (i) a first light source arranged on a first circuit element and electrically operable to emit light, (ii) a second light source arranged on a second circuit element and electrically operable to emit light, (iii) a third light source arranged on the first circuit element and electrically operable to emit light and (iv) a heat sink that is in thermally conductive connection with the first circuit element and the second circuit element;

wherein the first circuit element is disposed at a first side of the heat sink, and wherein the second circuit element is disposed at a second side of the heat sink, and wherein the first side of the heat sink is opposite the second side of the heat sink, and wherein a thickness of the heat sink extends between the first side of the heat sink and the second side of the heat sink;

wherein the second side of the heat sink is at an oblique angle relative to the first side of the heat sink;

wherein, with the vehicular rear window assembly mounted at the vehicle, and when the first light source is electrically operated to emit light, the first light source emits light that passes through the window panel and that is viewable by a person viewing the vehicular rear window assembly from exterior and rearward of the vehicle;

wherein, with the vehicular rear window assembly mounted at the vehicle, and when the second light source is electrically operated to emit light, the second light source emits light that illuminates an interior portion of the interior cabin of the vehicle;

wherein, with the vehicular rear window assembly mounted at the vehicle, and when the third light source is electrically operated to emit light, the third light source emits light that passes through the window panel to illuminate at least a portion of a bed of the vehicle;

wherein the lighting device comprises a light guide that includes (i) a first portion disposed between the first light source and the inner side of the window panel and (ii) a second portion disposed between the third light source and the inner side of the window panel;

wherein the first portion of the light guide directs light emitted by the first light source to pass through the window panel and the second portion of the light guide directs light emitted by the third light source to pass through the window panel;

wherein the heat sink draws heat from the first circuit element when the first light source is electrically operated to emit light; and wherein the heat sink draws heat from the second circuit element when the second light source is electrically operated to emit light.

27. The vehicular rear window assembly of claim 26, wherein the first portion of the light guide directs light emitted by the first light source to pass through the window panel at a first angle relative to a plane of the first circuit element, and wherein the second portion of the light guide directs light emitted by the third light source to pass through the window panel at a second angle relative to the plane of the first circuit element, and wherein the second angle is different from the first angle.

28. The vehicular rear window assembly of claim 26, wherein, with the vehicular rear window assembly mounted at the vehicle, the first light source of the lighting device is electrically operated to emit light responsive to actuation of a brake system of the vehicle to provide a center high mounting stop lamp feature of the vehicle.

* * * * *